(12) United States Patent
Starr et al.

(10) Patent No.: US 9,368,148 B2
(45) Date of Patent: Jun. 14, 2016

(54) EFFICIENT MOVES VIA SPARE CHAMBER

(75) Inventors: Matthew Thomas Starr, Lafayette, CO (US); Nathan Christopher Thompson, Boulder, CO (US); Daniel Spencer Zmolek, Boulder, CO (US); Mark Lorin Lantry, Erie, CO (US)

(73) Assignee: Spectra Logic, Corporation, Boulder, CO (US)

( * ) Notice: Subject to any disclaimer, the term of this patent is extended or adjusted under 35 U.S.C. 154(b) by 1182 days.

(21) Appl. No.: 13/280,522

(22) Filed: Oct. 25, 2011

(65) Prior Publication Data

US 2013/0101373 A1    Apr. 25, 2013

(51) Int. Cl.
*B65G 1/04*     (2006.01)
*G11B 15/68*    (2006.01)

(52) U.S. Cl.
CPC ............ *G11B 15/689* (2013.01); *B65G 1/0407* (2013.01)

(58) Field of Classification Search
CPC .................................................... B65G 1/0407
USPC ........................................ 414/807; 360/92.1
See application file for complete search history.

(56) References Cited

U.S. PATENT DOCUMENTS

| | | | |
|---|---|---|---|
| 4,386,382 A | 5/1983 | Cutler et al. | |
| 5,128,912 A | 7/1992 | Hug et al. | |
| 5,157,564 A | 10/1992 | Theobald et al. | |
| 5,235,474 A | 8/1993 | Searle | |
| 5,442,500 A | 8/1995 | Hidano et al. | |
| 5,521,586 A | 5/1996 | Takeshita | |
| 5,526,217 A | 6/1996 | Gormley et al. | |
| 5,684,654 A | 11/1997 | Searle et al. | |
| 5,724,321 A * | 3/1998 | Vishlitzky | 369/30.3 |
| 5,738,537 A | 4/1998 | Setoguchi et al. | |
| 5,768,047 A | 6/1998 | Ulrich et al. | |
| 5,818,723 A | 10/1998 | Dimitri | |
| 5,867,344 A | 2/1999 | Ellis et al. | |
| 5,940,355 A | 8/1999 | Buckland et al. | |
| 5,995,320 A | 11/1999 | Ostwald | |
| 6,034,928 A | 3/2000 | Inoue | |
| 6,215,611 B1 | 4/2001 | Gibbons | |
| 6,266,574 B1 | 7/2001 | Searle et al. | |
| 6,324,608 B1 | 11/2001 | Papa et al. | |
| 6,411,462 B1 | 6/2002 | Ostwald et al. | |
| 6,512,962 B2 | 1/2003 | Dimitri et al. | |
| 6,600,703 B1 | 7/2003 | Emberty et al. | |
| 6,639,751 B2 | 10/2003 | Brace et al. | |
| 6,650,961 B2 | 11/2003 | Deckers | |
| 6,661,602 B2 | 12/2003 | Benson et al. | |
| 6,704,832 B1 | 3/2004 | Ng | |
| 6,782,448 B2 | 8/2004 | Goodman et al. | |
| 6,796,813 B1 | 9/2004 | L'Hermet | |
| 6,813,113 B1 | 11/2004 | Mueller et al. | |
| 6,845,422 B2 | 1/2005 | Shimada et al. | |
| 6,859,854 B2 | 2/2005 | Kwong | |
| 6,880,033 B1 | 4/2005 | Mahmoud et al. | |
| 6,957,291 B2 | 10/2005 | Moon et al. | |
| 7,028,314 B2 | 4/2006 | Coffin et al. | |
| 7,039,924 B2 | 5/2006 | Goodman et al. | |
| 7,508,621 B2 * | 3/2009 | Pollard et al. | 360/92.1 |
| 2003/0040836 A1 | 2/2003 | Deckers | |
| 2004/0181388 A1 | 9/2004 | Yip et al. | |

* cited by examiner

*Primary Examiner* — Jonathan Snelting
(74) *Attorney, Agent, or Firm* — Kenneth Altshuler (57) ABSTRACT

A magazine-based data storage library is described that includes plurality of chambers each adapted to hold a magazine, that in turn, is adapted to hold a plurality of tape cartridges. The storage library further includes a tape drive adapted to read and write data to and from tape cartridges. The storage library further includes a vacant chamber that shifts from a first chamber when a recently used magazine is disposed therein to a second chamber when a new magazine is withdrawn there from. The recently used magazine most recently being withdrawn from a different chamber than the first chamber where it is later disposed.

6 Claims, 11 Drawing Sheets

EFFICIENT MOVES VIA SPARE CHAMBER

CROSS-REFERENCE TO RELATED APPLICATIONS

None.

BACKGROUND OF THE INVENTION

1. Field of the Invention

The present embodiments are directed to a data cartridge magazine library that is useful in storing data on a recording medium located in a cartridge and/or retrieving data from such a recording medium.

2. Description of Related Art

Presently, data cartridge magazine libraries transfer tape cartridges via a data cartridge magazine between a shelf system and a tape drive. If access to a target tape cartridge is required, for reading and/or writing data, the target tape cartridge disposed in a magazine is moved from a shelf system to the target tape drive where the target tape cartridge is loaded therein. Following any access requirement, the tape cartridge is returned to the shelf system via the corresponding magazine before a different tape cartridge often in a different magazine is accessed. These basic operations are essentially repeated each and every time a new tape cartridge is accessed.

It is to innovations related to this subject matter that the claimed invention is generally directed.

SUMMARY OF THE INVENTION

The present embodiments generally relate to a cartridge magazine-based library that reduces the number of robotic motion steps between a shelf system and drive by incorporating a spare chamber that can facilitate the exchange of one magazine for another with minimal movement of a robotic transporter. Some embodiments of the present invention contemplate a magazine-based data storage library comprising: a plurality of chambers each adapted to hold a magazine, the magazine adapted to hold a plurality of data cartridges; and a vacant chamber that shifts from a first chamber when a recently used magazine is disposed therein to a second chamber when a new magazine is withdrawn there from, the recently used magazine was most recently withdrawn from a different chamber than the first chamber.

Yet other embodiments of the present invention can therefore comprise a storage library arranged to perform a method, the method comprising: providing magazine-based data storage library that comprises a plurality of chambers each adapted to hold a magazine wherein at least one of the chambers is a vacant chamber that is devoid of holding one of the magazines; receiving a first instruction from a host computer to move a first data cartridge from a first physical slot to a first data transfer device; in response to the first instruction, moving a first magazine that possesses the first data cartridge from a first chamber to the first data transfer device, via a robotic transporter, and loading the first data cartridge in the first data transfer device; receiving a second instruction from the host computer to move a second data cartridge from a second physical slot to a second data transfer device after the first instruction; after receiving the second instruction, moving the first magazine to the vacant chamber and disposing the first magazine in the vacant chamber; after disposing the first magazine in the vacant chamber, moving a second magazine that possesses the second data cartridge from a second chamber to the second data transfer device, via the robotic transporter, and loading the second data cartridge in the second data transfer device; and after loading the second data cartridge in the second data transfer device, holding the second magazine near the second data transfer device pending a third instruction to return either the first tape cartridge to the first physical slot or the second tape cartridge to the second physical slot.

And, yet other embodiments of the present invention contemplate a method comprising: providing a magazine-based data storage library that comprises a first chamber, a second chamber and a vacant chamber, wherein each of the chambers are adapted to hold a magazine; holding a first magazine, that came from the first chamber, near a data transfer device that is performing data storage operations to a first data cartridge until a load command to load a second data cartridge in the data transfer device is received; disposing the first data cartridge held by the first magazine in the vacant chamber; moving the second data cartridge disposed in the second magazine from the second chamber to the data transfer device.

And, yet other embodiments of the present invention contemplate a method comprising: providing a magazine-based data storage library that comprises a first chamber, a second chamber and a vacant chamber, wherein each of the chambers are adapted to hold a magazine; moving a first magazine holding a first data cartridge to a vacant chamber from a data transfer device, wherein the first magazine was previously disposed in the first chamber; next, moving a second magazine holding a second data cartridge from the second chamber to the data transfer device; holding the second magazine near the data transfer device while the second data cartridge is engaged with the data transfer device and until a new load instruction is received.

DETAILED DESCRIPTION

Figure 1:
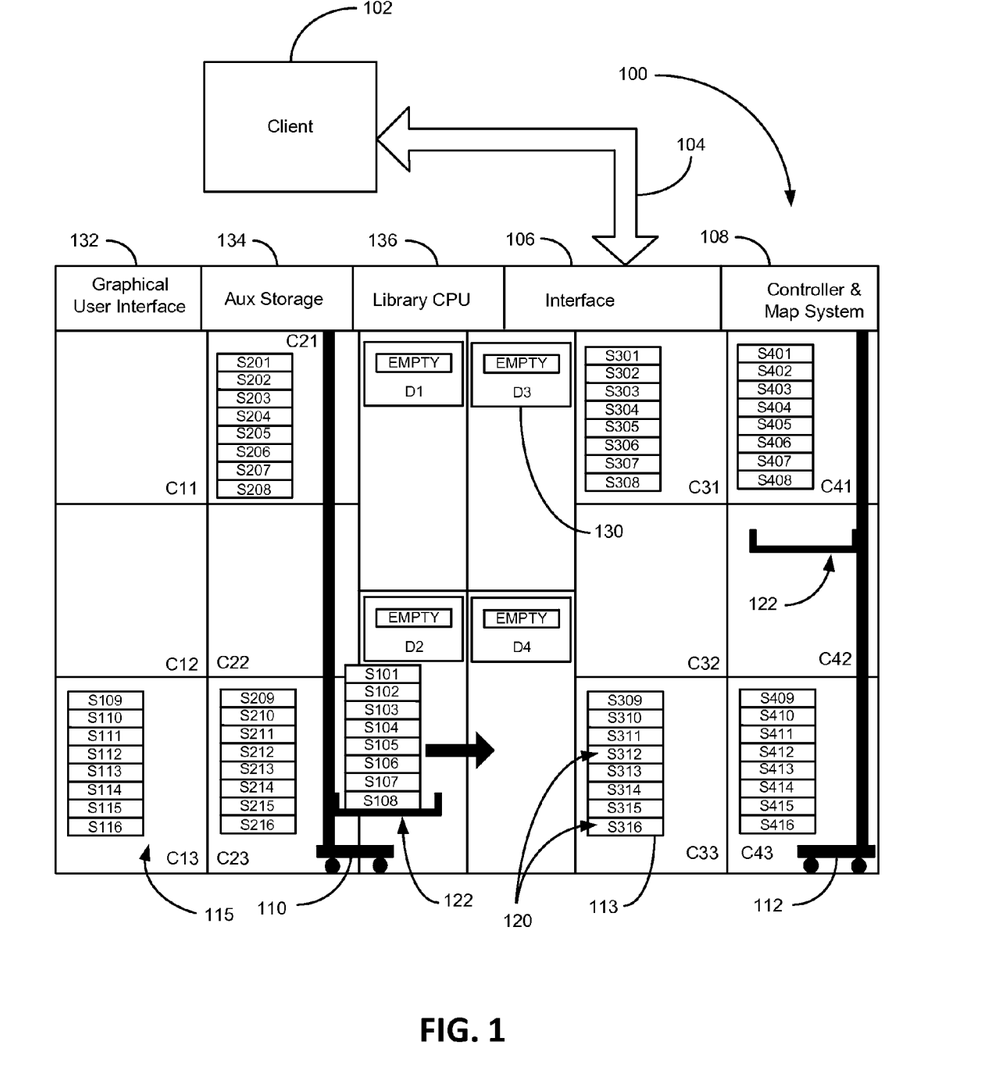
FIG. 1 is an illustration of a data storage arrangement constructed in accordance with certain embodiments of the present invention.

Referring to the drawings in general, and more specifically to FIG. 1, shown therein is an illustration of a data storage arrangement constructed in accordance with various embodiments of the present invention. In what follows, similar or identical structures may be identified using identical callouts.

The data storage arrangement illustrated in FIG. 1 can comprise a user of data 102, such as a client or host, also known as an Independent Software Vender (ISV), in communication with a magazine-based data storage library 100. As illustratively shown, the client 102 is in communication with the library 100 via a communication path 104 and the library interface device 106. The library 100 comprises a plurality of tape cartridges 120 disposed in a mobile (or portable) tape cartridge magazine 113. Herein, tape cartridge magazine 113 will be used to denote a generic tape cartridge magazine and tape cartridges 120 will be used to denote a generic cartridge. Each tape cartridge magazine 113 contains a plurality of physical slots (shown in FIGS. 2A and 2B) wherein each physical slot is adapted to accommodate a tape cartridge 120. The tape cartridge magazine 113 is an embodiment of a portable data cartridge magazine, which certain embodiments contemplate supporting optional kinds of data storage cartridges. A tape cartridge 120 is one embodiment of a portable data storage cartridge, which can include other cartridge devices, such as portable solid state devices (flash drives/solid state drives (SSD)), tape drive cleaning cartridges, conventional magnetic disk drives adapted for portability, such as in a cartridge, and other storage elements packaged accordingly, which are distinguishable over storage elements, such as stand-alone disks. Moreover, a portable data storage element is distinguishable over components that are built into a computer system or library. Such components are detachable and removable and replaceable, but are not shuttled around the system on a routine basis, rather they are essentially fixed in their respective system. Accordingly, portable data cartridges store and retrieve data when coupled to a data transfer device. In the present embodiment, the shelf system 115 (also shown here as C11, C12 and C13, for example) is arranged to archive the tape cartridge magazines 113, or independent tape cartridges 120, within the library 100.

Here, the library 100 may be configured to maintain a map of the physical slots in each magazine 113. More specifically, each physical slot in a magazine 113 will have a unique identification, such as a logical address, that is identifiable by the host computer 102 via a map of logical addresses provided by the library 100, such as a map system 108, in this example. A tape cartridge 120 disposed in a particular physical slot may assume the identity of the particular physical slot for purposes of the map system 108. Hence, a tape cartridge 120 disposed in a third physical slot having an address mapped as slot number three will assume the identity of slot number three, regardless of whether or not, for example, the tape cartridge 120 mapped as slot number three ends up in a different physical slot, such as slot number five. In other words, the tape cartridge will be mapped and identified as "slot number three" regardless of the physical slot, in this example. Optionally, a tape cartridge 120 can be simply identified by a serial number, or other indicia (such as a bar code, medium auxiliary memory information, etc.), and can be assigned, or mapped, to a physical slot, by a host computer 102, for example.

The library 100 can further comprise at least one robotic transporter, though in the depicted library embodiments, multiple transporters 110 and 112 are illustratively shown. The robotic transporters 110 and 112 comprises a carriage or other transporting means to carry a tape cartridge magazine 113 from the shelf system 115 to a position near the tape drive 130, that is, a position ready to load a tape cartridge 120 into a tape drive 130. Generically, a tape drive is denoted herein as data transfer device 130. An example of a robotic transporter 110 is a robotic device that is controlled (by a computer controller, for example) to move along a rail system via a belt device, a motorized rack and pinion arrangement, a lead screw arrangement, a motor with wheels, etc. The tape cartridge 120 can be loaded into or removed from a tape drive 130 via a picker device 122 that is carried by each robotic transport 110 and 112, for example. In greater detail the picker device 122 is adapted to grasp, in this case, a tape cartridge 120 from a magazine 113 and insert the tape cartridge 120 in a tape drive 130, or remove the tape cartridge 120 from a tape drive 130.

With continued reference to a data transfer device, which in the present depicted embodiment is a tape drive 130, a data transfer device facilitates data storage operations (such as, reading and writing) to and from a portable data cartridge device, such as a tape cartridge 120, solid state memory cartridge, or other portable memory device within the spirit of the embodiments described herein. By way of example, a tape drive 130 is an embodiment of a data transfer device that is adapted to cooperate, or relate, with a portable data storage cartridge. Hence, if a data storage cartridge is a portable solid state device, a data transfer device will likely include a connector device that connects with the solid state device, thus, facilitating storage operations between a client 102 and the portable solid state device, for example. The cooperating relationship between a tape cartridge 120 and a tape drive 130 is one that facilitates data storage operations, such as reading and writing data to and from the cooperating tape cartridge 120. Hence, a data cartridge is loaded in a data transfer device when reading and writing data to and from the data cartridge is enabled. In an optional embodiment, the tape cartridges 120 may be associated with different users of data, which can occur when the storage resources in the library 100 are divided into two or more partitions wherein each partition is associated with the different user of data, for example. The position ready to transfer the tape cartridge 120 into a tape drive from a magazine 113 is a location that facilitates a tape cartridge 120 to be inserted in one of the drives 130. In the present embodiment, the position ready to transfer the tape cartridge 120 into a tape drive from a magazine 113 does not require further movement via the robotic transporter 110, rather the picker device 122 moves a cartridge 120 from the magazine 113 to a drive 130. The position ready to transfer a tape cartridge 120 to the tape drive 130 is essentially a position where the robotic transporter 110 or 112 is servicing the tape drive 130 (i.e., the robotic transporter is controlled to move into a position to access a drive 130, or stay in a drive accessible position), thus the magazine 113 is held near the drive 130 by the robotic transporter. One example of being held near the drive 130 is when the robotic transporter is held essentially stationary while the picker 122 moves between the magazine 113 and the drive 130. Preferably, the picker 122 is within thirty-six inches from a drive 130. More preferably, the picker 122 is within twenty-four inches from a drive 130. Even more preferably, the picker 122 is within twelve inches from a drive 130. In contrast, a position where the magazine 113 is servicing a chamber 115 is not considered near a tape drive 130.

The library 100 also optionally comprises an entry/exit port (not shown) whereby tape cartridges 120 or tape cartridge magazine 113 comprising a plurality of tape cartridges 120 can be transferred between an environment external to the library 100 and an environment internal to the library 100. In this embodiment, the library 100 comprises a graphical user interface 132 and an auxiliary memory 134, such as one or more disk drives, solid state memory or other non-volatile memory device/s capable of retaining (storing) relevant information, such as logical addresses, for example. The library 100 further possesses a computer or Central Processing Unit (CPU) 136 that houses at least one macro-controller that actively cooperates with algorithms to orchestrate actions to components within the library 100, for example, over a Computer Area Network (CAN), not shown. The library 100 possesses a controller/map system 108, which can optionally be functionally included with the CPU 136. The controller/map system 108 maintains the addresses of the components mapped out for the client 102 (i.e., tape slot addresses, drive addresses, robot addresses, etc.) to direct operations within the library 100. FIG. 1 is illustrative of basic components used to exemplify inventive embodiments disclosed herein. As one skilled in the art will appreciate, a data storage library will generally include devices and structures not shown in the block illustration of FIG. 1, such as additional controllers (e.g., those controlling other components in the library including the robotic transporter 110), wiring, cooling systems, switch systems, lighting, protocol bridges, etc.

The client 102, or host computer, identifies (or "sees") the components within the library 100 by transmitting a Small Computer Systems Interface (SCSI) inquiry to scan the storage system's bus (not shown) to discover what devices comprise the storage system 100. Optionally, the map system 108 can provide the information directly to the client 102. An inquiry can be a client 102 effectively asking the storage system 100 "who are you?" and "what are you?" The storage system 100 can be displayed showing a plurality of tape cartridges 120 located at specified slot addresses and showing that there are four tape drives 130 (D1, D2, D3, and D4) at designated addresses and a first robotic transporter 110 and a second robotic transporter 112 at designated logical addresses that are able to receive instructions from the client 102, for example.

Figure 2A:
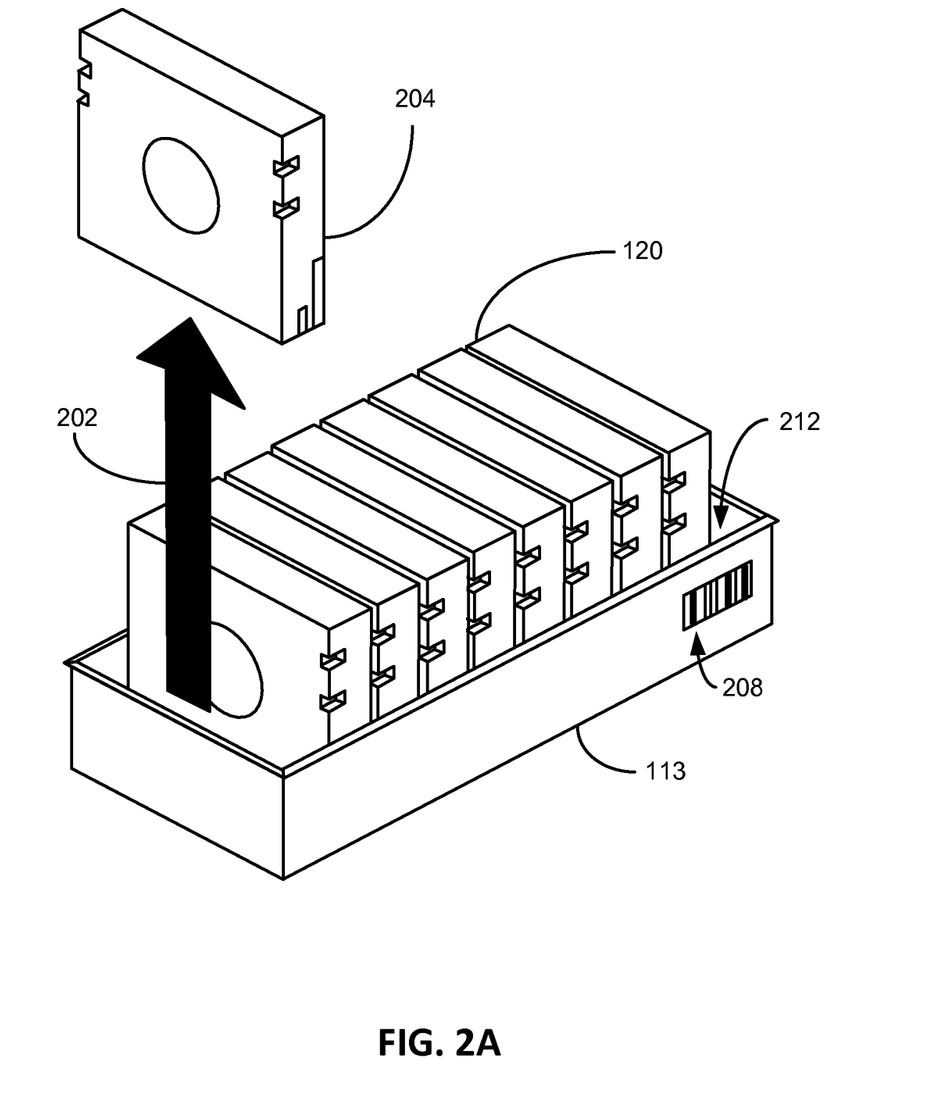
FIG. 2A shows a perspective illustration of a tape magazine supporting tape cartridges constructed in accordance with certain embodiments of the present invention.

With reference to FIG. 2A, shown therein are tape cartridges 120 supported by a tape cartridge magazine 113. In more detail, a tape cartridge 120, such as an LTO-3 category tape cartridge, comprises magnetic tape that is capable of storing digital data written by a compatible drive 130, such as an LTO-3 tape drive manufactured by IBM of Armonk, N.Y., when in cooperation to read and write data (i.e., loaded) with the tape cartridge 120, as shown in FIG. 1. The tape cartridge magazine 113 is illustratively shown populated with a plurality of tape cartridges 120. A tape cartridge 120 can be removed from the tape cartridge magazine 113, as shown by the arrow 202, and inserted into a tape drive 130 by means of a picker device (not shown). Disposed on the tape cartridge magazine 113 is a bar code identifier 208 for identifying the tape cartridge magazine 113, which has utility should the tape cartridge magazine 113 be archived in a media pack storage vault that is remote from a library (i.e., not in a library), for example. In some embodiments, all tape cartridges 120 contain a Medium Auxiliary Memory (MAM) device (not shown), however, in alternative embodiments, some tape cartridges may not contain a MAM device. One example of a MAM device is a flash memory device that is activated by radio frequency. In other embodiments of the present invention, the magazine 113 can comprise a magazine auxiliary memory device (not shown) that is capable of containing information (such as tape slot address mapping information, e.g., a tape cartridge corresponding to "slot-1" can retain the identity of "slot-1" on the tape cartridge's MAM) from at least one of the data cartridges 120 disposed in the magazine 113. The magazine auxiliary memory device 112 can receive information that is maintained on the tape cartridge MAM devices contained via one or more MAM device readers/writers associated with a tape drive 130, or some reader not associated with a tape drive 130, for example. Information from the MAM devices can be read and immediately transmitted to the magazine auxiliary memory device, or alternatively, the information of each MAM device can be stored on the auxiliary storage device 134 and then transferred to the magazine auxiliary memory device, just to name two examples.

A MAM device, in one embodiment, is parceled into three regions in which data can be stored: a medium device region, which contains information such as a serial number (or some information corresponding to a tape's bar code, for example), a device region which can contain information from the tape drive such as load count, and host/vendor unique region wherein information such as history and/or performance data related to the cartridge 120 can be stored. The information in the regions can be supplemented with new information via an address related to the arrangement of available storage space in the cartridge MAM device. Optionally, the information can be read by an auxiliary memory reader, such as a MAM reader, and reassembled with additional information and stored on the MAM device as the reassembled version, just to name two examples. In another example, if the storage limit is reached in the MAM device, such as the host/vendor data in the host/vendor unique region, the host/vendor data can be read and stored in an auxiliary storage space, such as the auxiliary memory 134, and the host/vendor unique region purged and made available for new information. In another example, the host/vendor data can be compressed with algorithms to decompress residing in the library 100 or user of data, for example.

Figure 2B:
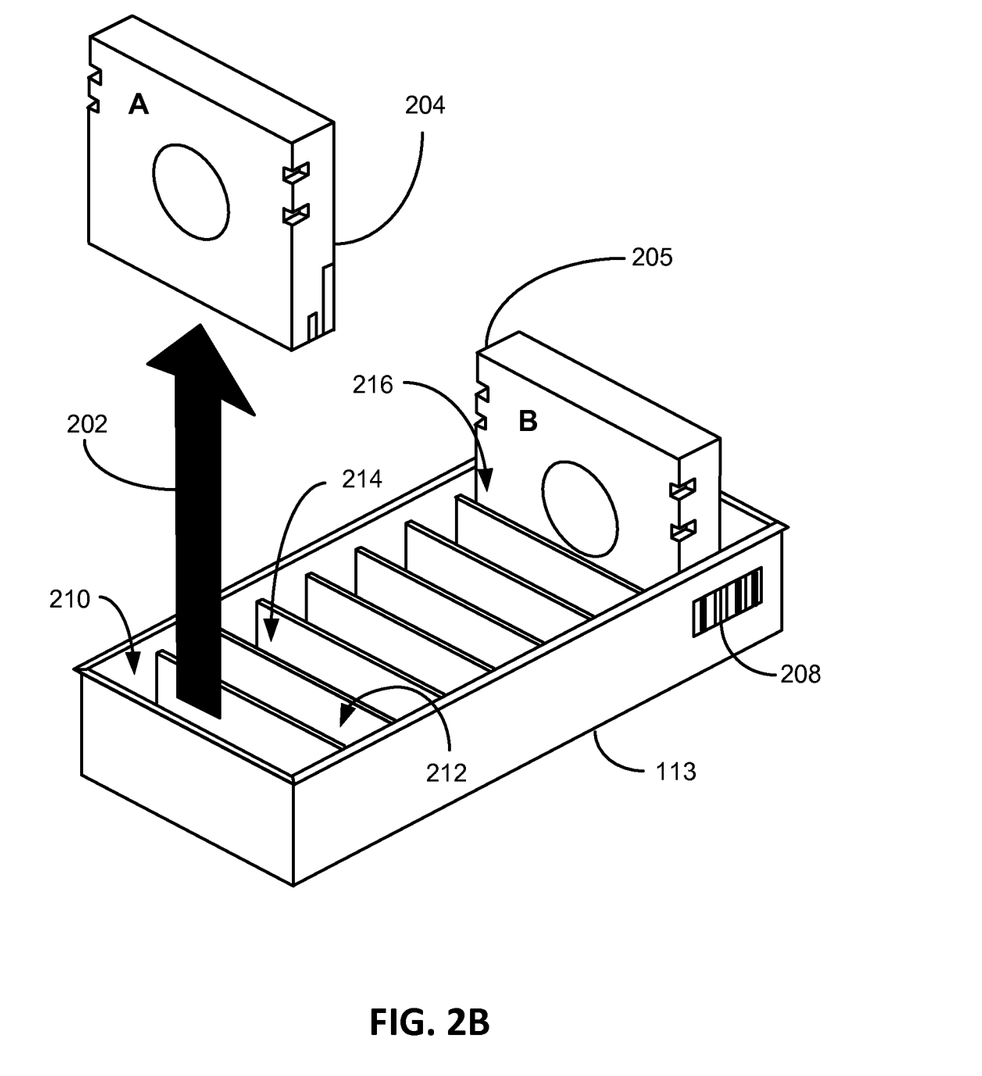
FIG. 2B shows a perspective illustration of a tape magazine revealing tape cartridge slots constructed in accordance with certain embodiments of the present invention.

FIG. 2B is an illustration of a mostly empty magazine 113 consistent with embodiments of the present invention. Here, in one exemplary embodiment, the magazine 113 possesses a plurality of physical slots, such as a first slot 210, a second slot 212, a third slot 214, etc. The depicted magazine 113 can be mapped to a client 102 as possessing slots one through nine. The tape cartridge "A" 204 originated from the first slot 210 and, therefore, is also mapped to correspond to the first slot address, or more specifically, the tape cartridge 204 with an address associated with the first slot 210. Tape cartridge "B" 205 is the only other tape cartridge shown in FIG. 2B and is disposed in the eighth slot 216. The tape cartridge "B" 205 resides in the eighth slot 216 and, therefore, is also mapped as corresponding to the eighth slot 216 address, or more specifically, the tape cartridge 205 possessing an address associated with the eighth slot 216.

Figure 3A:
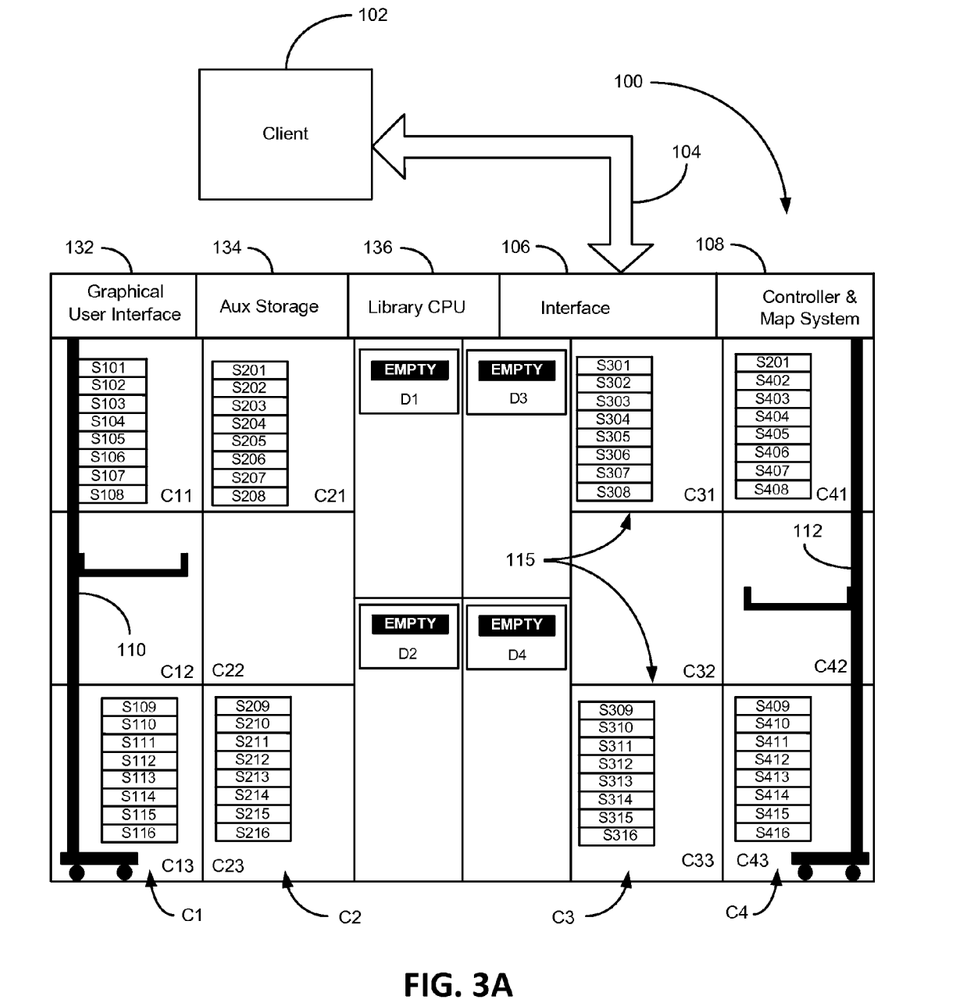
FIGS. 3A-3F are illustrations of a magazine-based data storage library with dual robotic transporters and multiple cabinets constructed in accordance with an embodiment of the present invention.
Figure 3B:
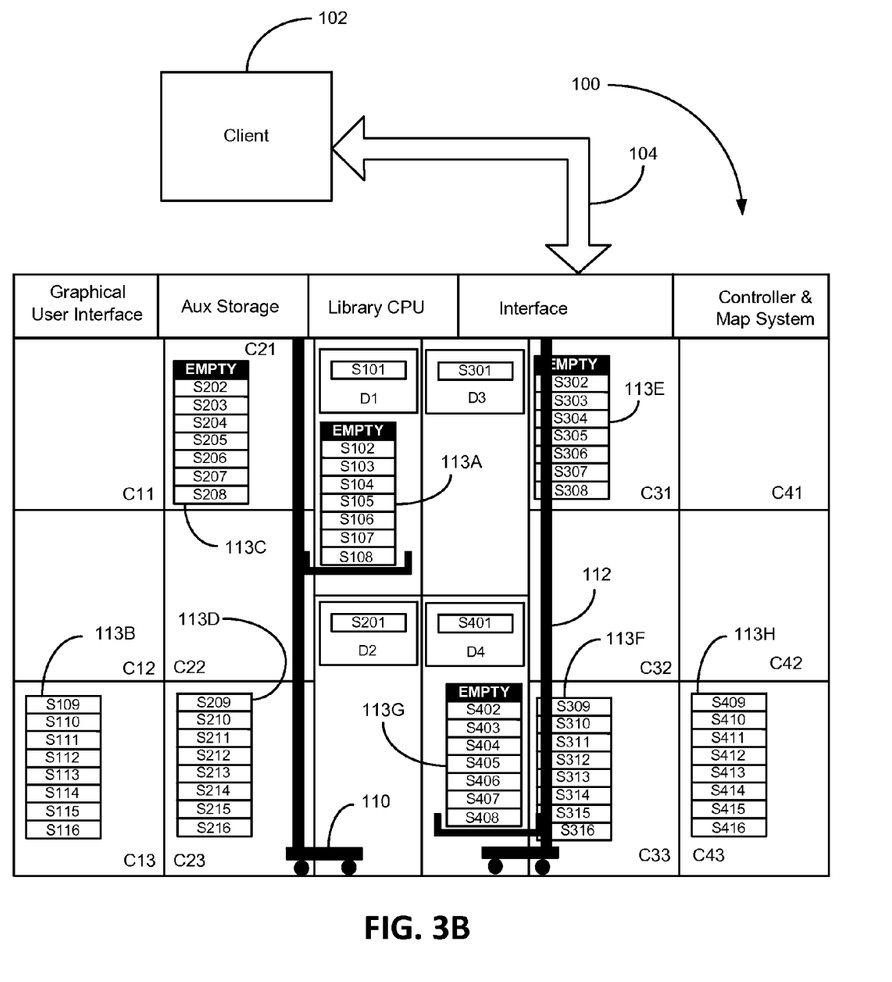

FIGS. 3A-3E illustrate an embodiment of moving magazines 113 within the library 100 consistent with embodiments of the present invention. With reference to FIG. 3A, the depicted embodiment of the library system 100 possesses four cabinets cabinet-1 C1, cabinet-2 C2, cabinet-3 C3, and cabinet-4 C4. The library system 100 further depicts four empty tape drives 130, D1, D2, D3, and D4, located between the cabinets C1-C4. The empty tape drives 130 are not engaged with a tape cartridge 120. Each cabinet possesses a plurality of chambers, for example, C1 possesses chambers C11, C12, and C13, likewise, C2 possesses chambers 21, 22, and 23, and so on. As illustratively shown, each cabinet possesses a spare chamber, or vacant chamber; that is, a chamber that is devoid of a magazine 113, i.e., it is vacant. In the depicted embodiment, the spare chambers are C12, C22, C32, and C42. Each magazine 113 provides eight physical slots that each accommodate a tape cartridge 120. In the forgoing description, each tape cartridge is identified by indicia, such as S101, which follows the tape cartridge 120. In other words, the logical map of each tape cartridge presented to the ISV will follow the individual tape cartridge. Hence, as depicted in FIG. 3A, S101-S116 reside in C1, S201-S216 reside in C2, S301-S316 reside in C3, and S401-S416 reside in C4.

Figure 3C:
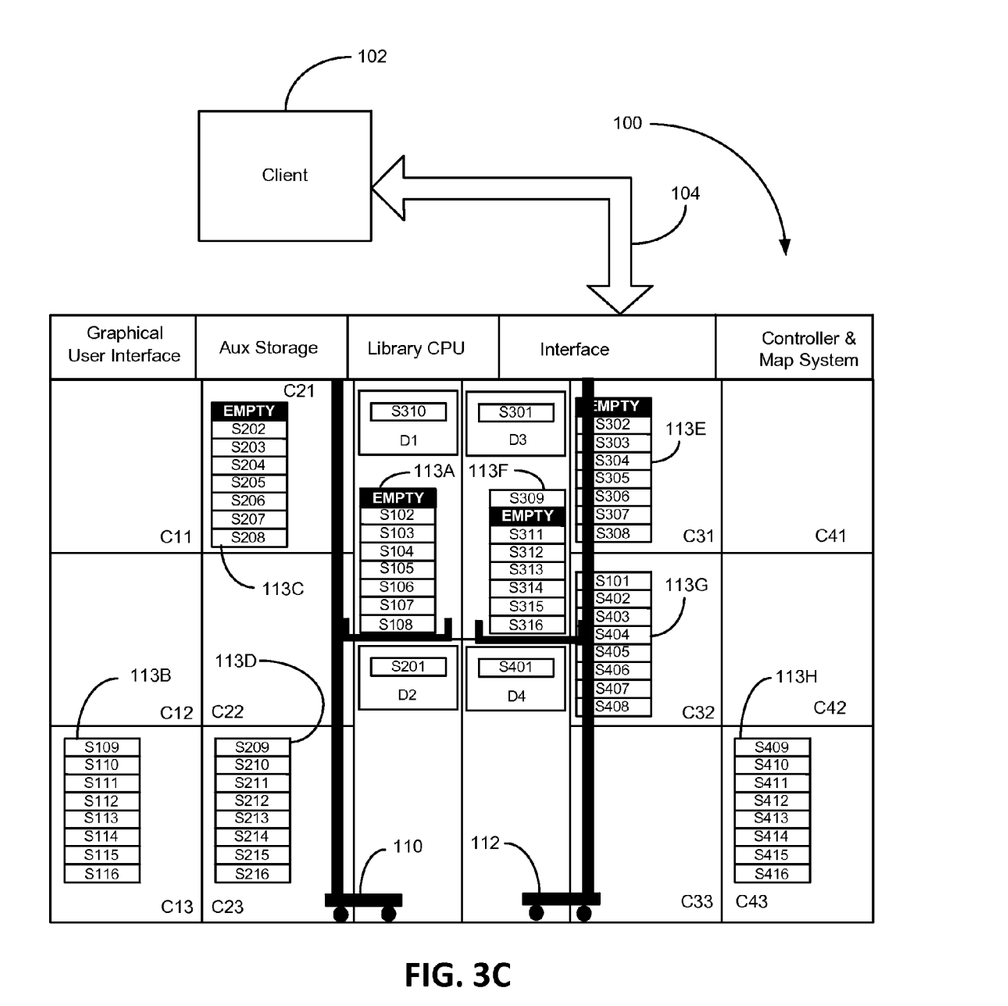
Figure 3D:
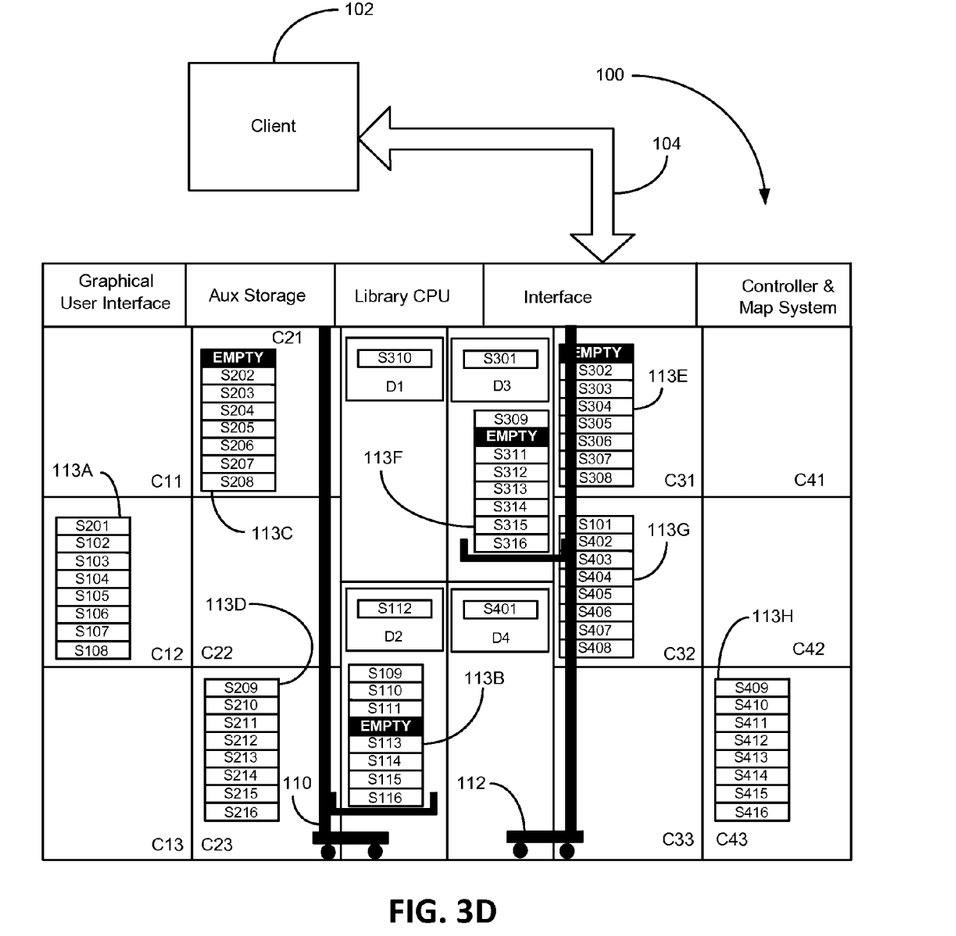
Figure 3E:
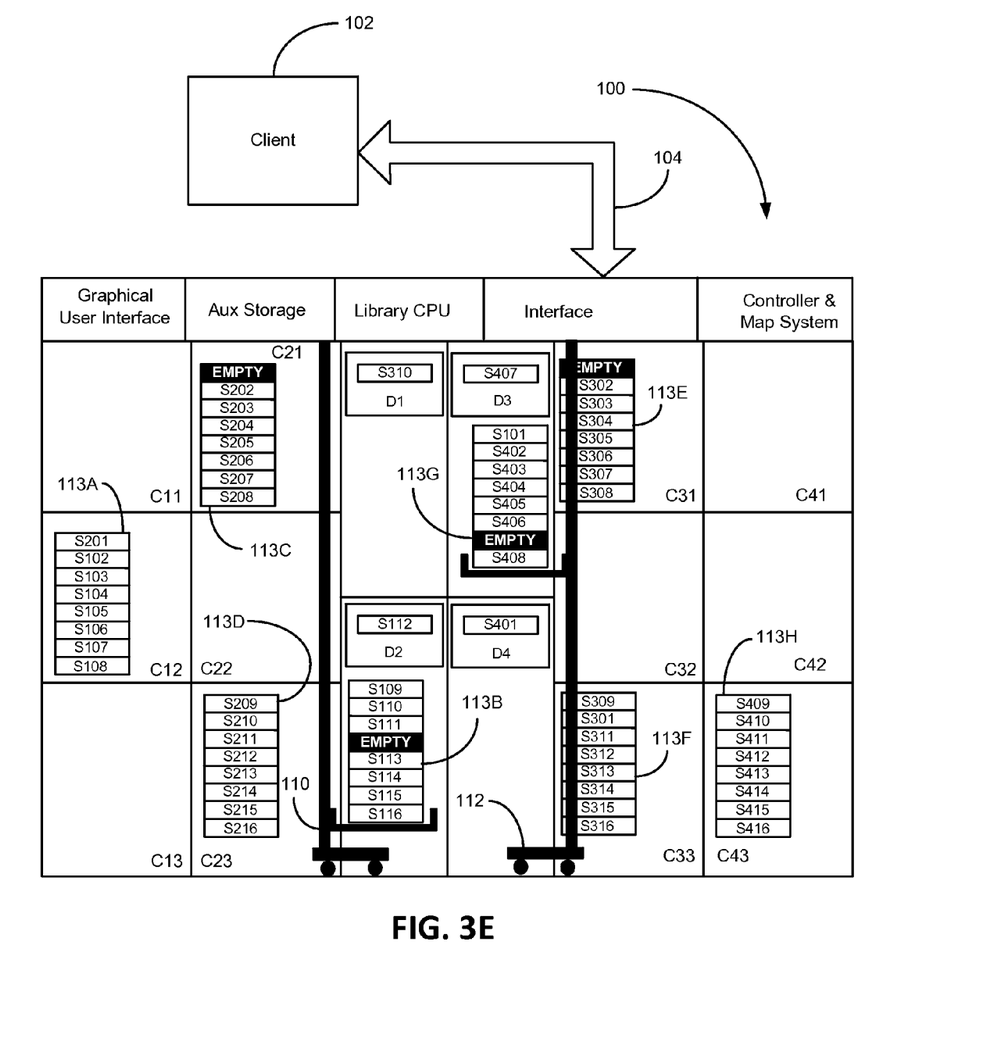
Figure 3F:
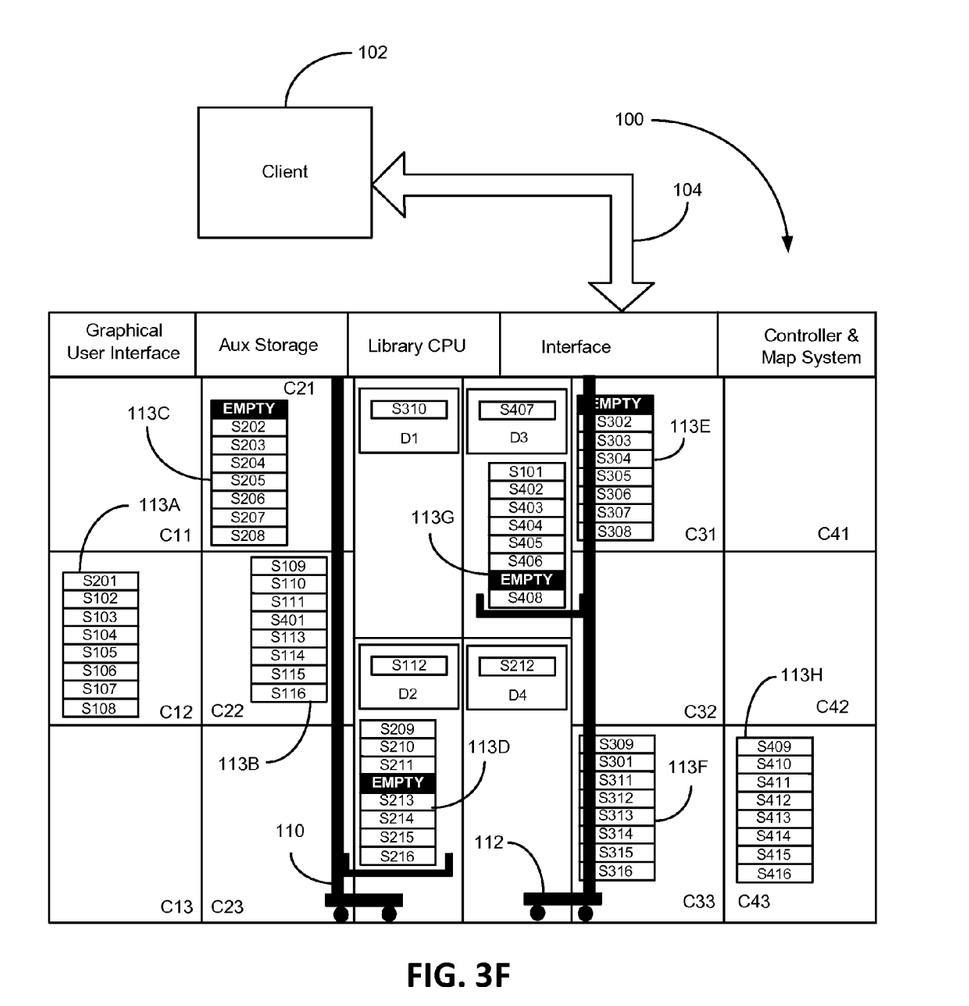
Figure 4:
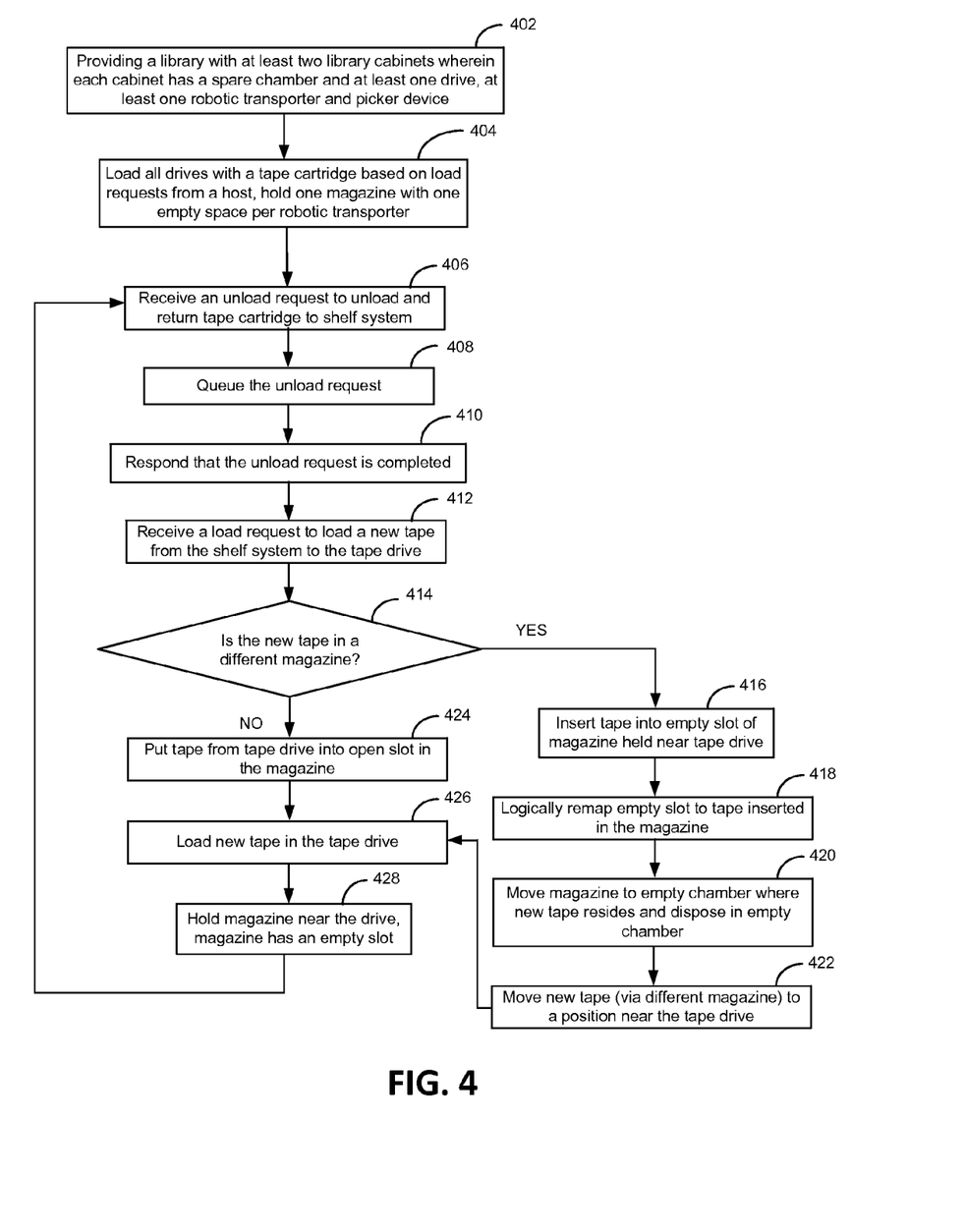
FIG. 4 is a block diagram of a method consistent with certain embodiments of the present invention.

FIG. 4 illustrates an embodiment of a method for efficiently moving tape cartridges 120 within the storage library 100 through the utilization of the spare chambers. FIG. 4 is described in conjunction with FIGS. 3A-3F. It should be recognized that the steps presented in the described embodiments of the present invention do not necessarily require any particular sequence unless otherwise stated. With reference to step 402 in conjunction with FIG. 3A, the library 100 is provided with minimal components to describe the described embodiments. With regards FIG. 3A, the tape drives D1-D4 are empty when the library 100 receives a request from a host computer 102 to mount (move and load) (a) tape cartridge with logical address 101 (hereinafter tape cartridges with logical addresses will be denoted as "S#", for example "S101") to D1, (b) S201 to D2, (c) S301 to D3, and (d) S401 to D4. Certain embodiments contemplate the library 100 carrying out requests (a)-(d) in order while other embodiments contemplate carrying out requests (a)-(d) in a different order than received. As illustratively shown in FIG. 3B and step 404, requests (a)-(d) are carried out with magazine 113A (a recently used magazine) that recently held S101 is retained near D1 via the first robotic transporter 110 and magazine 113 that recently held S401 is retained near D4 via the second robotic transporter 112. A mount request is simplified herein for ease of illustration, however, in actuality, there is a sequence of instructions that occurs, including identifying and moving the first tape cartridge 120 from the corresponding slot to loading the first tape cartridge 120 in an engaged, cooperating relationship with the tape drive 130 ready to perform read/write operations, etc.

With regards to step 406, the library 100 receives a request to unmount S101 from D1, which essentially is to unload S101 from D1 and return to S101 to the shelf system 115. In step 408, the request to unmount S101 from D1 is queued in memory and (step 410) a response is sent to the host computer 102 affirming completion of the request, even though in reality completion of the unmount S101 from D1 has not been done. The response to the host computer 102 that the request to unmount S101 from D1 is virtually accomplished may be done to get the host computer 102 to send a new request to mount a new tape to D1. In other words, in certain storage systems, the host computer 102 will not issue any additional requests until the host computer 102 has confirmation that the present request (in this case the unmount request) is completed (i.e., requests that are serial). Certain embodiments contemplate other responses to the host computer 102 that do not include virtually carrying out requests. As shown in step 412, a request to mount S310 to D1 is submitted by the host computer 102. As illustratively shown in FIG. 3B, because S310 is in magazine 113F located in C33 (step 414), and the second robot 112 services C3 and C4, S101 is unloaded from D1 and disposed in the empty slot in magazine 113G (step 415) where the empty slot can be logically remapped to S101 (step 418). Magazine 113G is then moved to and disposed in the spare chamber C32 (near C33). The second robotic transporter 112 then moves magazine 113F to a position near D1 (step 422) and loads S310 in D1 (step 426). As shown in FIG. 3C, the second robotic transporter 112 then waits with magazine 113F near D1 pending a new request from the host 102 (step 428).

When a new request from the host 102 is received this time to unmount S201 from D2, and return to S201 to the shelf system 115, the library 100 essentially repeats the logic starting from step 406. In step 408, the request to unmount S201 from D2 is queued in memory and (step 410) a response is sent to the host computer 102 affirming completion of the request, even though in reality carrying out the request to unmount S201 from D2 has not been done. As previously discussed, by sending the response that S201 is unloaded from D2 and returned to its respective slot (even though it has not been done), in some situations, may prompt the host computer 102 to send a new request to mount a new tape to D2. As shown in step 412, a request to mount S112 to D2 (which the host computer 102 sees as empty) is received from the host computer 102. As illustratively shown in FIG. 3C, because S112 is in magazine 113B located in C13 (step 414), and the first robot 110 services C1 and C2, S201 is unloaded from D2 and disposed in the empty slot in magazine 113A (step 415) where the empty slot can be logically remapped to S201 (step 418). Magazine 113A is then moved to and disposed in the spare chamber C12 (near C13). The first robotic transporter 110 then moves magazine 113B from C13 to a position near D2 (step 422) and loads S112 in D2 (step 426). As shown in FIG. 3D, the first robotic transporter 110 then waits with magazine 113B near D2 pending a new request from the host 102 (step 428).

When a new request from the host 102 is received this time to unmount S301 from D3, and return to S301 to the shelf system 115, the library 100 essentially repeats the logic starting from step 406. In step 408, the request to unmount S301 from D3 is queued in memory and (step 410) a response is sent to the host computer 102 affirming completion of the request, even though in reality carrying out the request to unmount S301 from D3 has not been done. As shown in step 412, a request to mount S407 to D3 (which the host computer 102 sees as empty) is received from the host computer 102. As illustratively shown in FIG. 3D, because S407 is in magazine 113G located in C32 (step 414), and the second robot 112 services C3 and C4, S407 is unloaded from D3 and disposed in the empty slot in magazine 113F (step 415) where the empty slot can be logically remapped to S301 (step 418). Magazine 113F is then moved to and disposed in the spare chamber C33 (near C32). The second transporter 112 then moves magazine 113G from C32 to a position near D3 (step 422) and loads S407 in D3 (step 426). As shown in FIG. 3E, the second robotic transporter 112 then waits with magazine 113G near D3 pending a new request from the host 102 (step 428).

When a new request from the host 102 is received, this time to unmount S401 from D4, and return to S401 to the shelf system 115, the library 100 essentially repeats the logic starting from step 406. In step 408, the request to unmount S401 from D4 is queued in memory and (step 410) a response is sent to the host computer 102 affirming completion of the request, even though in reality carrying out the request to unmount S401 from D4 has not been done. As shown in step 412, a request to mount S212 to D4 (which the host computer 102 sees as empty) is received from the host computer 102. As illustratively shown in FIG. 3E, because S212 is in magazine 113D located in C23 (step 414), and the first robot 110 services C1 and C2, S401 is unloaded from D4 and disposed in the empty slot in magazine 113B (step 415) where the empty slot can be logically remapped to S401 (step 418). Magazine 113B is then moved to and disposed in the spare chamber C22 (near C23). The first transporter 110 then moves magazine 113D from C23 to a position near D4 (step 422) and loads S212 in D4 (step 426). As shown in FIG. 3F, the second robotic transporter 112 then waits with magazine 113D near D4 pending a new request from the host 102 (step 428).

FIGS. 3A-3F illustrate the steps of moving a magazine 113 efficiently within the library 100 while maintaining at least one spare chamber per cabinet. Hence, the spare chamber shifts from one location to another.

Figure 5:
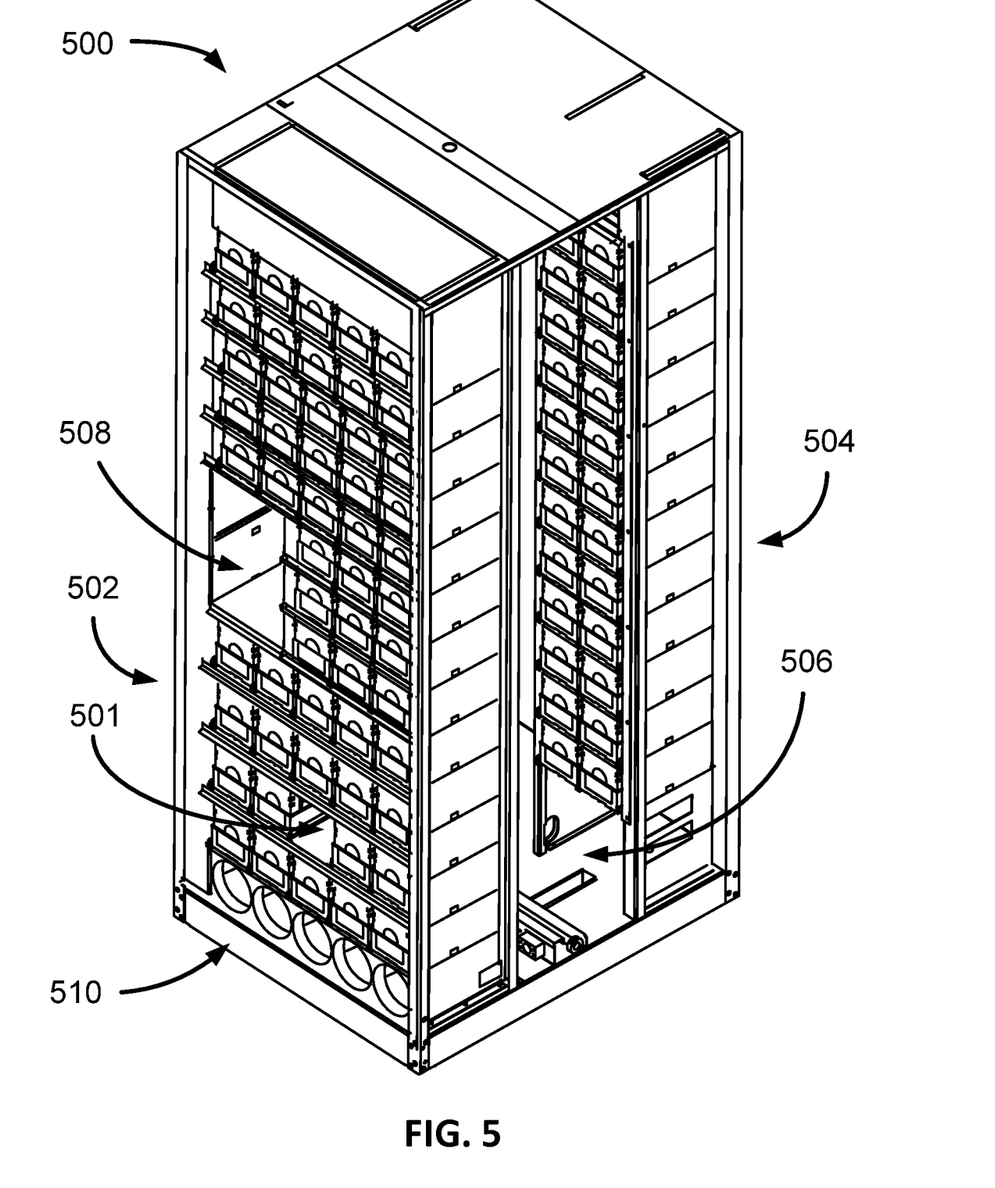
FIG. 5 is an illustration of a T-Finity library cabinet wherein embodiments of the present invention can be commercially practiced.

Embodiments of the present invention can be commercially practiced in a Spectra Logic T-Finity tape cartridge library manufactured by Spectra Logic of Boulder Colo. FIG. 5 shows a commercial embodiment of one T-Finity unit 500 without an enclosure, whereby the T-Finity unit 500 is a single cabinet whereby multiple cabinets can be combined to make an expandable library. The T-Finity unit 500 comprises a first and second shelf system 502 and 504 that are adapted to support a plurality of the mobile media, such as tape cartridge magazines 113 comprising a plurality of LTO-3 tape cartridges, archived by the library 500. The second shelf system 504 comprises at least one drive (not shown) adapted to read and write data to and from a tape cartridge. Functionally interposed between the first and second shelf system 502 and 504 is a magazine transport space 506. The magazine transport space 506 is adapted to provide adequate space for a tape cartridge magazine 113 to be moved, via a magazine transport (not shown) and cartridge picker device (not shown), from a position in the first shelf system 502, for example, to/near a drive. The shelf system 502 has at least one spare chamber 501. Tape cartridge magazines 113 can be transferred into and out from the T-Finity library via an entry/exit port 508. Transferring tape cartridge magazines 113 in and out of the T-Finity library can be accomplished by an operator for example. The T-Finity library comprises a means for cooling as shown by the fans 510, located at the base of the unit 500.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, more than two robots and more than four cabinets can be used in conjunction with spare chambers to efficiently move magazines 113 within a library assembly while still maintaining substantially the same functionality without departing from the scope and spirit of the present invention. Another example can include using these techniques across multiple library partitions, to name a few examples while still maintaining substantially the same functionality without departing from the scope and spirit of the present invention. Further, though communication is described herein as between a client and the library, such as the library 100, communication can be received directly by addressable components, such as the first drive 130, via the interface device 106, for example, without departing from the scope and spirit of the present invention. Further, for purposes of illustration, a first and second tape drive and first and second tape cartridges are used herein to simplify the description for a plurality of tape drives and tape cartridges. Additionally, multiple robotic transporters can work together to enhance move efficiency. Finally, although the preferred embodiments described herein are directed to tape cartridge systems, such as the tape cartridges and tape storage systems, such as a tape library and tape drives, and related technology, it will be appreciated by those skilled in the art that the teachings of the present invention can be applied to other systems, such as solid state media adapted to be moved or other storage related "cartridges", without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method comprising:
   providing magazine-based data storage library that comprises a plurality of chambers each adapted to hold a magazine wherein at least one of said chambers is a vacant chamber that is devoid of holding one of said magazines;
   receiving a first instruction from a host computer to move a first tape cartridge from a first physical slot to a first data transfer device;
   in response to said first instruction, moving a first magazine that possesses said first tape cartridge from a first chamber to said first data transfer device, via a robotic transporter, and loading said first tape cartridge in said first data transfer device;
   receiving a second instruction from said host computer to move a second tape cartridge from a second physical slot to a second data transfer device after said first instruction;
   after receiving said second instruction, moving said first magazine to said vacant chamber and disposing said first magazine in said vacant chamber;
   after disposing said first magazine in said vacant chamber, moving a second magazine that possesses said second tape cartridge from a second chamber to said second data transfer device, via said robotic transporter, and loading said second tape cartridge in said second data transfer device; and
   after loading said second tape cartridge in said second data transfer device, holding said second magazine near said second data transfer device pending a third instruction to return either said first tape cartridge to said first physical slot or said second tape cartridge to said second physical slot.

2. The method of claim 1 further comprising:
   receiving said third instruction from said host computer to return said first tape cartridge to said first physical slot;
   responding to said host computer that said third instruction is carried out before actually carrying out said third instruction;
   queuing said third instruction;
   receiving a fourth instruction from said host computer to move a third tape cartridge from a third physical slot to said first data transfer device;
   after receiving said fourth instruction, disposing said first tape cartridge in said second physical slot followed by disposing said second magazine in either said first chamber or said second chamber via said robotic transporter;
   after disposing said second magazine in either said first chamber or said second chamber, moving a third magazine that possesses said third tape cartridge from a third chamber to said first data transfer device, via said robotic transporter, and loading said third tape cartridge in said first data transfer device.

3. The method of claim 1 wherein said second magazine is held by said robotic transporter during said holding step.

4. The method of claim 3 wherein near said second data transfer device is a position ready to load said second tape cartridge in said second data transfer device or unload said second tape cartridge from said second data transfer device.

5. The method of claim 1 further comprising mapping said first physical slot from said first magazine to said second magazine.

6. The method of claim 5 further comprising disposing said first tape cartridge in said second magazine in said mapped slot.

* * * * *